(12) United States Patent
Ancorotti

(10) Patent No.: US 7,987,860 B2
(45) Date of Patent: Aug. 2, 2011

(54) METHOD FOR MAKING A COMPOSITE ITEM COMPRISING A COSMETIC PRODUCT AND AN ORNAMENTAL ELEMENT

(75) Inventor: Renato Ancorotti, Crema (IT)

(73) Assignee: Gamma Croma S.p.A., Milan (IT)

( * ) Notice: Subject to any disclaimer, the term of this patent is extended or adjusted under 35 U.S.C. 154(b) by 411 days.

(21) Appl. No.: 12/158,576

(22) PCT Filed: Dec. 15, 2006

(86) PCT No.: PCT/IB2006/003635
§ 371 (c)(1),
(2), (4) Date: Sep. 25, 2008

(87) PCT Pub. No.: WO2007/072149
PCT Pub. Date: Jun. 28, 2007

(65) Prior Publication Data
US 2009/0293904 A1 Dec. 3, 2009

(30) Foreign Application Priority Data
Dec. 21, 2005 (IT) .............................. MI2005A2438

(51) Int. Cl.
*A45D 33/00* (2006.01)
*A45C 11/04* (2006.01)
*B65D 69/00* (2006.01)
*B65D 71/00* (2006.01)

(52) U.S. Cl. .......... 132/293; 206/6.1; 206/235; 206/581

(58) Field of Classification Search .................. 132/293, 132/200, 286, 294, 295, 298, 300, 303, 314, 132/315, 317, 305, 319, 307, 306; D28/4–6, D28/8, 76–79, 81–83, 87, 88, 90; 206/581, 206/823, 449, 38, 235, 6.1, 566; 29/10; 63/1.16, 1.18, 26, 42, 43; 211/85.2; 428/67; 264/DIG. 55
See application file for complete search history.

(56) References Cited

U.S. PATENT DOCUMENTS
2,053,996 A * 9/1936 Bartlett .......................... 428/138
(Continued)

FOREIGN PATENT DOCUMENTS
EP 1 325 692 7/2003
(Continued)

OTHER PUBLICATIONS
www.ReadytoWear.ie (Gem Radiant Complexion Powder) 2009.*

*Primary Examiner* — Todd E Manahan
*Assistant Examiner* — Vanitha Elgart
(74) *Attorney, Agent, or Firm* — Lucas & Mercanti, LLP

(57) ABSTRACT

A method for making a composite item which has a cosmetic product, or layer thereof, and a decorative element. The decorative element is inserted within a seat formed in the cosmetic product and the composite item is inserted within a container for cosmetics. The method includes the steps of: providing at least one through hole within the cosmetic product, or layer thereof, such that the through hole has a size which allows the decorative element to be at least partially inserted therein; fastening or resting the decorative element onto a support which has a base portion that geometrically interferes with at least one inlet opening of the through hole, preventing the base portion from entering the through hole; and arranging, at least partially, the decorative element within the through hole, through the inlet opening with the base portion being engaged with the inlet opening of the through hole.

20 Claims, 2 Drawing Sheets

U.S. PATENT DOCUMENTS

| | | | |
|---|---|---|---|
| D316,761 S * | 5/1991 | Golden et al. | D28/4 |
| D321,415 S * | 11/1991 | Chen | D28/80 |
| 5,320,116 A * | 6/1994 | Ackermann | 132/293 |
| 5,338,591 A * | 8/1994 | Poll | 428/67 |
| D370,307 S * | 5/1996 | Chen | D28/79 |
| 5,655,553 A * | 8/1997 | Giese et al. | 132/303 |
| 5,813,420 A * | 9/1998 | Sussman | 132/294 |
| 6,058,942 A * | 5/2000 | Eng | 132/200 |
| 6,076,533 A * | 6/2000 | Cohen et al. | 132/298 |
| D441,915 S * | 5/2001 | Wardlaw | D28/83 |
| D469,222 S * | 1/2003 | Thorpe et al. | D28/79 |
| D472,676 S * | 4/2003 | Lai | D28/79 |
| D478,190 S * | 8/2003 | Sheng | D28/82 |
| 6,715,609 B1 * | 4/2004 | Gupton | 206/457 |
| D517,736 S * | 3/2006 | Shen | D28/82 |
| 7,047,983 B2 * | 5/2006 | Manougian et al. | 132/294 |
| D542,475 S * | 5/2007 | Martinez | D28/83 |
| 7,316,235 B2 * | 1/2008 | Maio et al. | 132/293 |
| D583,997 S * | 12/2008 | Thorpe | D28/83 |
| D589,208 S * | 3/2009 | Taniguchi et al. | D28/4 |
| 2002/0121284 A1 * | 9/2002 | Avalle | 132/319 |
| 2006/0005853 A1 * | 1/2006 | Shen | 132/296 |
| 2007/0071534 A1 * | 3/2007 | Ancorotti et al. | 401/130 |
| 2010/0017944 A1 * | 1/2010 | Hirschmann et al. | 2/244 |

FOREIGN PATENT DOCUMENTS

| | | |
|---|---|---|
| ES | 2 027 585 | 6/1992 |
| WO | WO 03/082603 | 10/2003 |
| WO | WO 2004/056494 | 7/2004 |

\* cited by examiner

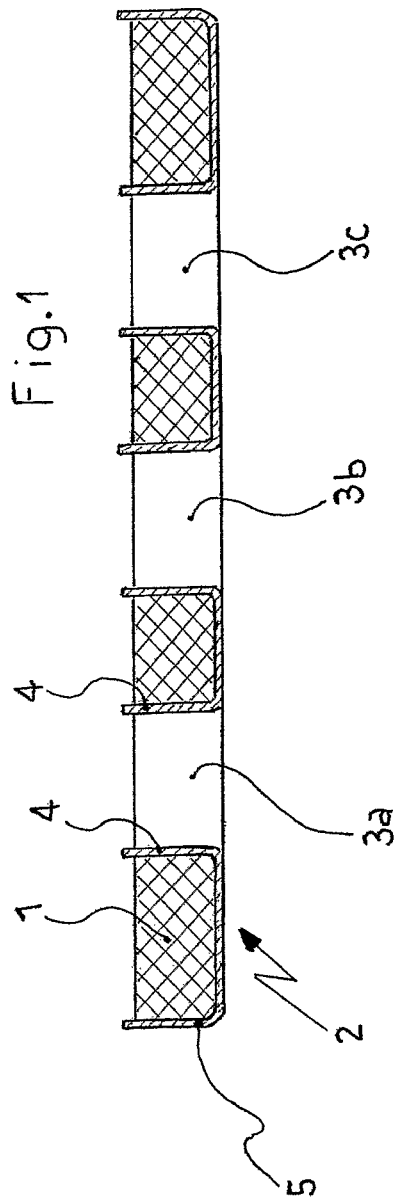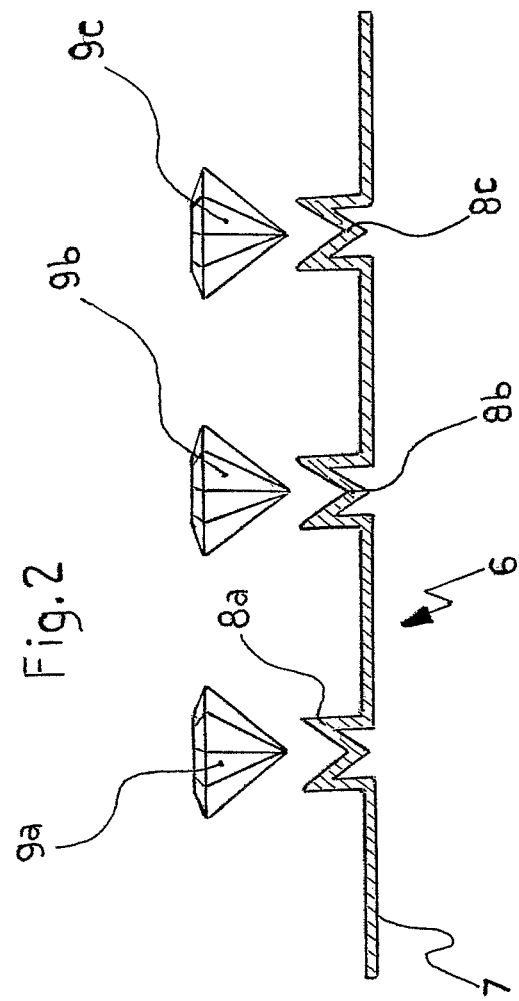

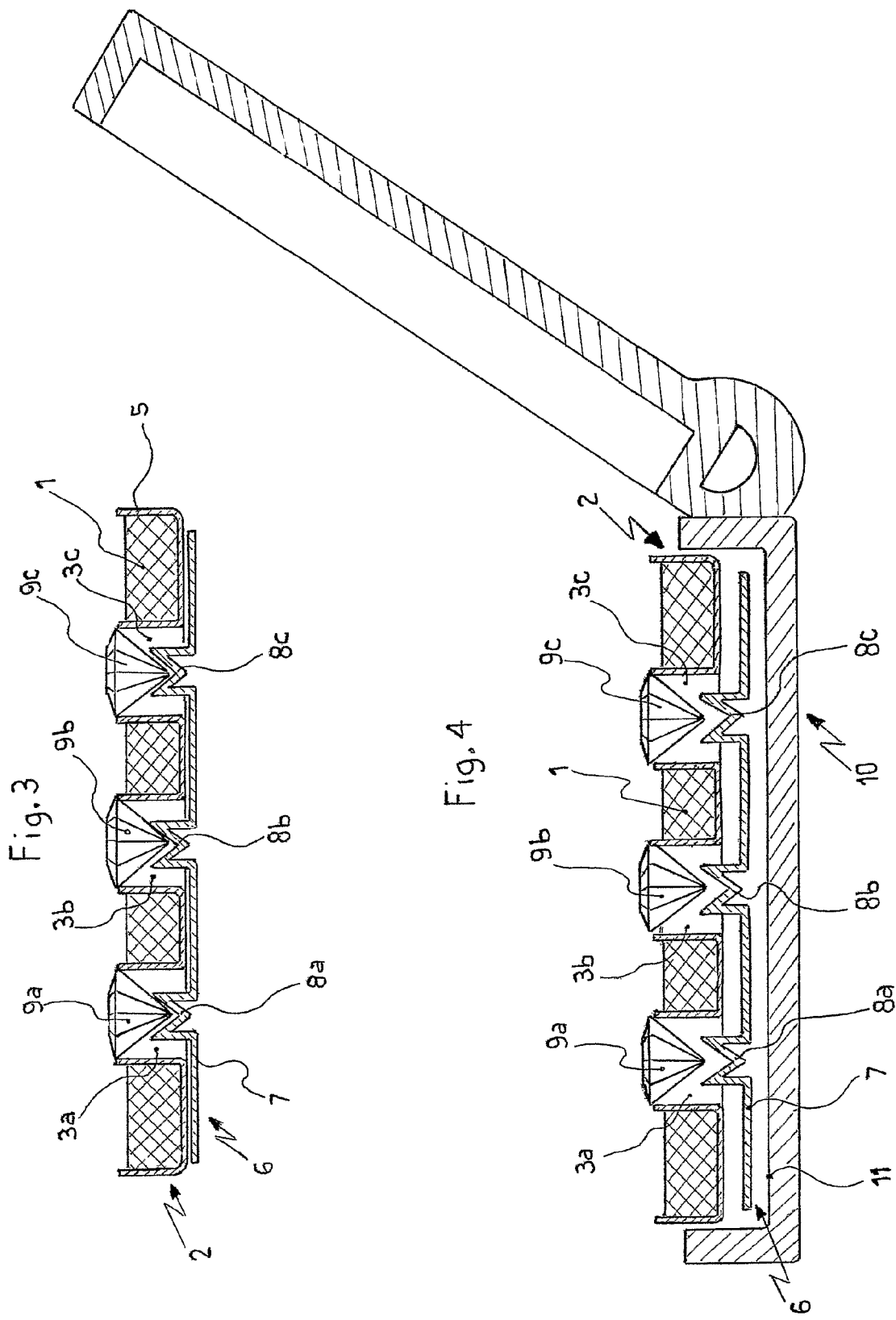

US 7,987,860 B2

METHOD FOR MAKING A COMPOSITE ITEM COMPRISING A COSMETIC PRODUCT AND AN ORNAMENTAL ELEMENT

FIELD OF THE INVENTION

The present invention relates to a composite item comprising a cosmetic product and a decorative (i.e. ornamental) element, which is inserted within the cosmetic product, as well as a method for making this composite item.

BACKGROUND ART

The decoration of the visible surfaces of a cosmetic product by coupling the latter with cosmetically-acceptable foreign materials is a procedure that is carried out by means of different techniques that have been well known in the art to the purpose of making the cosmetic product more appealing to the final user.

In the case of solid cosmetic products, such as the so-called cosmetics obtained from baked pastes or from compressed powders, or in the case of cosmetic products with solid consistency, such as those obtained with the method described in the Italian Patent Application IT MI 2001 A 002841 in the name of the same Applicant, this decoration with cosmetically-acceptable foreign materials is usually carried out by simply coupling, such as by gluing, the visible surface of the cosmetic product to portions of different multicoloured cosmetic products, or by means of inclusion of foreign cosmetic elements in suitable seats or recesses being formed on the exposed surface of the cosmetic product, or still by applying coloured inks, with cosmetically acceptable pigments, to the outer surface of the base product, such as taught by French Patent FR 2.759.941 (DIOR).

The Spanish Patent ES 2 027 585 (AVON) teaches to decorate a basic solid cosmetic product obtained from waxy pastes or pressed powders, with decorative elements consisting of other cosmetic compositions. These decorative elements are coupled to the basic cosmetic product by means of a metal mask which has the function of defining, within the same basic product, one or more seats for these decorative cosmetic elements.

More particularly, according to AVON patent, in the case of a basic cosmetic product obtained from pressed powders, the metal mask is inserted within the cosmetic product itself such as to obtain a blind hole, a decorative cosmetic element, such as a cosmetic in a different colour, is then inserted within the metal mask and the latter is then removed from the basic cosmetic product.

On the other hand, in the case of a waxy cosmetic product, the method described in ES 2 027 585 provides that the decorative cosmetic element is first placed within the metal mask, then the basic cosmetic product is cast around this metal mask, and the metal mask is finally removed.

This method described in ES 2 027 585 (AVON), though being effective when the decorative cosmetic element is mechanically or chemically similar to the basic cosmetic product, such as to be held thereby, results to be quite unsuitable when decorative elements are desired to be placed on the visible surface of the basic product, which are not similar to the latter, because the retention of the decorative elements on the basic product cannot be ensured in this case.

Furthermore, the AVON method does not explicitly provide for the use of decorative elements other than cosmetic compositions, such as for example decorative elements consisting of glass, metal or plastic inserts.

The use of non-cosmetic decorative elements coupled to liquid cosmetic products is known, for example, from the Japanese Patent JP 2000-128175 in the name of YOSHINO, whereas the Applicant has proposed, in the Community Registered Design No. 000120316, a series of cosmetic products, either solid or with solid consistency, for make up, which are decorated by means of glass or crystal objects.

In the latter case, the decoration of the surface of a basic cosmetic product, particularly for make up, with non-cosmetic decorative solid elements can be provided by forming seats (or blind holes) in the basic cosmetic product, for example by means of moulding or engraving the latter, and then arranging, and optionally fastening, for example by means of gluing, said decorative solid elements thereto.

This method, while being effective in holding the non-cosmetic decorative elements onto the visible surface of the basic cosmetic product, however, proves to be quite complicated and expensive and can cause the decorative element to be contaminated with the cosmetic product, and the consequent degradation of the desired aesthetic effect.

Furthermore, when glues are used between the non-cosmetic decorative elements and the basic cosmetic product, the retention of the decorative element within the seat thereof results to be quite ineffective, mainly when the basic cosmetic product is of a pressed powder type.

Finally, in the case of cosmetic products obtained from cast and solidified waxy pastes, it is substantially not possible to glue a decorative element to the cosmetic product, and the fastening between the decorative and cosmetic elements can be at most provided by simple rest.

Accordingly, it is an object of the present invention to propose a method for providing a composite item comprising a basic cosmetic product and a preferably non-cosmetic decorative element, which results to be easy to manufacture and allows the decorative element to be effectively held onto said basic cosmetic product.

Another object of the present invention is to propose a method for making a composite item comprising a basic cosmetic product and a decorative element, preferably non-cosmetic, which can be either adapted to solid cosmetics obtained from pressed powders, cosmetics obtained from cast waxy pastes, or extruded and/or baked cosmetics, and ensuring an optimum coupling of the decorative element to the cosmetic product, while preventing the decorative element from being contaminated by the cosmetic product.

A further object of the present invention is to making a composite item consisting of a cosmetic product and at least one preferably non-cosmetic decorative element, which allows the decorative element to be easily removed from the cosmetic product, while ensuring a perfect retention of the decorative element onto the cosmetic product.

SUMMARY OF THE INVENTION

These and other objects are achieved by the method for making a composite item comprising a cosmetic product and at least one decorative element according to the first independent claim, and the following claims depending thereon, and by the composite item according to the fourteenth independent claim and following claims depending thereon.

According to the present invention, the method for making a composite item comprising at least one cosmetic product, or layer thereof, and at least one decorative element, and in which this decorative element is inserted within a seat being formed in the cosmetic product, and in turn, the resulting composite item is inserted within a container for cosmetics, comprises the steps of:

a. providing at least one through hole within the cosmetic product, or layer thereof, such that the through hole has such a size as to allow said decorative element to be at least partially inserted therein;

b. fastening or resting the decorative element onto a support, this support having at least one base portion that is shaped as to geometrically interfere with at least one of the inlet openings of the through hole, thus hindering or preventing the base portion from entering the through hole;

c. arranging, at least partially, the decorative element within the through hole, through said inlet opening, such that said base portion of the support is engaged with the inlet opening of the through hole.

Thereby, as will be better appreciated from the description of a preferred embodiment of the method according to the invention herein below, the decorative element, which is preferably a non-cosmetic solid element, can be associated with a cosmetic product within a through hole being formed in the latter, in a firm and simple manner, using a support that holds the decorative element, while interfering, due to the shape thereof, with said through hole, thereby facilitating the assembly of the finished composite item, and when the decorative element is firmly fastened to the support, it also ensures a firm coupling between the decorative element and the cosmetic product.

In a preferred embodiment of the method according to the present invention, said base portion of the support is provided to be interposed between the cosmetic product and the lower wall of the container for cosmetics within which the finished composite item is arranged. Thereby, the fastening of the support, and thus of the decorative element, to the cosmetic product is ensured by the mutual interference of parts that are placed opposite to each other, in a very simple manner.

According to a preferred aspect of the method according to the present invention, the step of providing at least one through hole within the cosmetic product comprises a step of placing the cosmetic product into a containment bottom base having at least one hole matching said through hole of the cosmetic product, and then the said preferred step of interposing the base portion of the support between the cosmetic product and the lower wall of the container provides that said base portion of the support is interposed between the bottom base and lower wall of the container for cosmetics.

Thereby, the through hole in the cosmetic product can be substantially provided without dimensional errors, as this through hole is defined by the bottom base itself, which is preferably a particular made of moulded plastic material.

Furthermore the direct coupling between the support for the preferably non-cosmetic decorative element, and the bottom base, prevents said base portion of the support from interfering with the cosmetic product, and damaging the latter.

According to a further aspect of the present invention, the method can also provide a step of shielding one or more outer surfaces of the decorative solid element, prior to the step of arranging, at least partially, the decorative element within the through hole within the cosmetic product.

The composite item, according to the present invention, comprises at least one cosmetic product, or layer thereof, and at least one decorative element, preferably though not exclusively consisting of a non-cosmetic element, which is either fastened or rested onto a support and inserted, at least partially, within a hole formed in this cosmetic product, or layer thereof. Advantageously, said hole in the cosmetic product is a through hole, and the support comprises a base portion that is shaped as to geometrically interfere with at least one of the inlet openings of the through hole, thus hindering or preventing the base portion from entering the through hole.

As stated above, the use of holding support for the decorative element facilitates the manufacture of the composite item and can ensure a firm coupling between the decorative element and cosmetic product.

In a preferred embodiment of the item according to the present invention, the cosmetic product is arranged within a bottom base having at least one hole at said through hole and the support of the decorative element is placed such as to allow the decorative element to be, at least partially, inserted within the hole in the bottom base, and thus within the through hole of the cosmetic product, and to cause the base portion of the support to be engaged with the bottom base matching the hole. The insertion of this composition within a container for cosmetics, such as to interpose the base product of the support of the decorative element between the bottom base and the lower wall of the container for cosmetics, allows the support to be held, along with the decorative element that may be fastened to the latter, onto the cosmetic product.

It should be observed that by "bottom base" is meant herein and below any support base for one or more cosmetic products, which is shaped such as to, at least partially, provide these cosmetic products with the shape desired to be obtained for the finished product, and in many cases, to facilitate or allow the manufacture of the finished product itself.

BRIEF DESCRIPTION OF THE DRAWINGS

A preferred embodiment of the method according to the present invention, as well as a particular composite item obtained by means of this preferred embodiment will be now described by way of non-limiting example, with reference to the annexed figures, in which:

FIG. 1 is a schematic side sectional view of a bottom base for cosmetics being provided with through holes;

FIG. 2 is a schematic side sectional view of a support for decorative elements suitable for being used for implementing a preferred embodiment of the method according to the present invention;

FIG. 3 is a schematic side sectional view of a composite item resulting from the support in FIG. 2 being coupled with the bottom base in FIG. 1; and FIG. 4 is a schematic side sectional view of the composite item provided by assembling the set in FIG. 3 to a container for cosmetics.

DETAILED DESCRIPTION OF A PREFERRED EMBODIMENT OF THE INVENTION

With reference to the figures annexed herein, the method according to the present invention for making a composite item of the type comprising at least one cosmetic product 1 and at least one decorative element 9a, 9b or 9c, wherein the decorative element 9a, 9b or 9c is preferably, though not exclusively, a non-cosmetic element, generally provides the steps of:

a. making at least one through hole 3a, 3b or 3c within the cosmetic product 1, or within a layer thereof, such that the decorative element 9a, 9b or 9c that is intended to be associated with the cosmetic product 1 can be at least partially inserted within the through hole 3a, 3b, 3c and thus result visible to the final user;

b. fastening or resting the decorative element 9a, 9b or 9c onto a support 6, which has a double function of facilitating the assembly of the drilled cosmetic product 1 onto the decorative element 9a, 9b or 9c and holding the latter relative to the cosmetic product 1, both during and after this assembly. The support 6 comprises a base portion 7 being shaped by size and/or shape such as to interfere with the inlet opening of the through hole 3a, 3b or 3c and thus substantially prevent the whole support 6 from entering the through hole 3a, 3b, 3c. This has clearly the purpose of holding, in the position as desired by the operator, the support 6, and thus the decorative element 9a, 9b or 9c, relative to the cosmetic product 1.

c. arranging, at least partially, the decorative element 9a, 9b or 9c in the through hole 3a, 3b or 3c thereof, through said inlet opening, until said base portion 7 of the support 6 is engaged with said through hole 3a, 3b or 3c, or better with the surrounding regions of the inlet opening of the latter, such that this support 6 cannot be inserted within this through hole 3a, 3b or 3c.

As relates to the initial step of making at least one through hole 3a, 3b or 3c within the cosmetic product 1, this can be made in different ways, according to the prior art, as a function of the cosmetic product 1 to be worked. For example, in the case of extruded cosmetics, the hole 3a, 3b or 3c can be provided during the extrusion, by means of suitable pins placed in the extruder, or before drying, by means of punching.

Again, in the case of cosmetics 1 obtained from pressed powders or slurries that are subjected to compression, these can be arranged in a suitable drilled bottom base and then pressed. In the case of cosmetics 1 obtained from cast viscous compositions, the through hole can be obtained during the step of casting the cosmetic product 1, by means of a suitable matrix.

The number, shape and size of the through holes 3a, 3b, 3c provided on the cosmetic product 1 can be certainly changed as a function of the various decorative elements 9a, 9b, 9c that can be associated with this cosmetic product 1. It is thus possible to provide a plurality of through holes (not illustrated) having mutually different shape and size within the same cosmetic product 1, which are arranged for housing corresponding decorative elements, also being mutually different, and are thus provided with inlet openings engaging with the base portions of the relative supports for the decorative elements, such as to prevent these base portions from entering the through holes.

The number, shape and size of the decorative elements 9a, 9b, 9c associated with the cosmetic product 1 can also be obviously different from each other, such that a plurality of different decorative elements (not shown in the figures) can be housed within said through holes 3a, 3b, 3c.

It should be then noted that, also as a function of the type of cosmetic product 1 being used, the subsequent step of fastening or simply resting the decorative element 9a, 9b or 9c onto the relative support 6 can be provided either before or after said step of providing the through hole 3a, 3b or 3c.

Furthermore, the decorative element 9a, 9b or 9c can be variously bonded onto the support 6, such as by means of gluing, mechanical retention by interposition/juxtaposition of parts, (at least partial) covering with a retention—preferably transparent—component being firmly bonded to the support 6, etc.

When the decorative element 9a, 9b, 9c is simply rested onto the support 6, on the other hand, the retention of the decorative element 9a, 9b or 9c to the cosmetic product 1 can be finally provided by means of a suitable shape of the through hole 3a, 3b or 3c that, due to the interference of surfaces of the same cosmetic product 1 with the decorative element 9a, 9b or 9c, can prevent the latter from disengaging from the relative hole 3a, 3b or 3c.

After said step of inserting the decorative element 9a, 9b or 9c within the through hole 3a, 3b or 3c thereof, while it is simultaneously held in place due to the interference of the base portion 7 of the support 6 with the cosmetic product 1, a subsequent step of introducing the thus-obtained composite item within a container for cosmetics 10 allows obtaining the finished product as desired.

The interposition of the base portion 7 of the support 6 between the cosmetic product 1, or layer thereof, and the bottom wall 11 of the container for cosmetics 10, or another cosmetic or another layer of the cosmetic product 1, or alternatively, the provision of an integral fastening of the support 6 with this container 10, allows the firm coupling between the decorative element 9a, 9b or 9c and the cosmetic product 1.

In greater detail, in the particular embodiment of the method according to the present invention, to which the figures attached herein are referred, a first step is provided of making more through holes 3a, 3b, 3c within a cosmetic product 1, such as made from cosmetic powders pressed in a bottom base 2.

In this first step, the cosmetic powders 1 are first arranged within a bottom base 2 provided with holes 3a, 3b, 3c being defined, within the peripheral wall 5 of the base 2, by inner side walls 4 of the latter, which have the function of preventing the powders 1 from entering these holes 3a, 3b, 3c. The subsequent compression of these powders 1 determines the through holes 3a, 3b and 3c to be definitely formed in the cosmetic product 1.

It should be observed that the holes provided in the bottom base 2 as defined by the inner side walls 4, may also be not through holes, provided that they allow the corresponding decorative element 9a, 9b, 9c to be visible from the outside. For example, the walls 4 may extend in a transparent upper cover, which would obviously close the holes formed in the bottom base 2, without thereby preventing the formation of through holes 3a, 3b, 3c in the cosmetic product 1.

It should be also observed that, when a bottom base 2 is used for supporting the cosmetic product 1, according to the type of cosmetic product 1 being used, the inner side walls 4 defining the holes in the bottom base 2, can be provided flush with the upper outer surface of the cosmetic product 1, or they can end well under this outer surface, or yet they can project above this surface, also as a function of the aesthetic effect one desires to obtain.

In the case of pressed cosmetic powders 1 as illustrated herein, the walls 4 of the bottom base 2 are, due to requirements of the manufacturing method, substantially flush with the outer surface of the cosmetic 1, as can be seen in FIG. 1.

After, or prior to, said step of making the cosmetic product 1 with through holes 3a, 3b, 3c, in this case by means of the drilled bottom base 2, a step is provided of bonding decorative elements 9a, 9b, 9c to a support 6 that has, as seen in FIG. 2, some projections 8a, 8b, 8c, which allow these decorative elements 9a, 9b, 9c to be rested and fastened onto the support 6, and which are made integral with a substantially flat base portion 7, of the support 6.

The support 6, as will be understood by those skilled in the art, can be made of any plastic, metallic, composite material, or also of natural fibers (such as cardboard), or the like, provided that it has a sufficient rigidity to bear the decorative elements 9a, 9b, 9c, without deforming upon use. Similarly, the bottom base 2 can be made of any polymeric, or ceramic material, or the like, as known in the field.

Furthermore, in the embodiment as illustrated herein, particularly, the decorative elements 9a, 9b, 9c are non-cosmetic solid elements, for example diamond-cut crystals, which can be glued, mechanically held, or simply rested onto the projections 8*a*, 8*b*, 8*c*, which are in this case suitably shaped to accommodate these elements 9*a*, 9*b*, 9*c*.

The elements 9*a*, 9*b*, 9*c*, according to a peculiar aspect of the present invention as illustrated in the figures, can for example consist of non-cosmetic solid bodies, such as glass bodies, crystals, polymeric or metallic items, stones, etc.

It should be noted that, when the elements 9*a*, 9*b*, 9*c* are simply rested onto the shaped projections 8*a*, 8*b*, 8*c*, the holes 3*a*, 3*b*, 3*c* can be tapered to the outlet opening thereof, i.e. the opening opposite that within which the decorative elements 9*a*, 9*b*, 9*c* can be inserted, such as to prevent the decorative elements 9*a*, 9*b*, 9*c* from projecting from said outlet opening.

Alternatively, according to a peculiar aspect of the present invention, the decorative elements 9*a*, 9*b*, 9*c* can be integrally held onto the support 6, at the projections 8*a*, 8*b*, 8*c*, using at least one covering/shielding element for the decorative elements 9*a*, 9*b*, 9*c*, that preferably consists of a transparent polymeric film, which is then integrally fastened to the support 6 by means of gluing or melting 6.

The covering/shielding element can only cover some or all of the surfaces of the decorative elements 9*a*, 9*b*, 9*c* such as to be interposed between the exposed surfaces of these decorative elements 9*a*, 9*b*, 9*c* and the cosmetic product 1, and such as to protect the decorative elements 9*a*, 9*b*, 9*c* from any aggressive action exerted by the components of the cosmetic 1.

Therefore, this covering/shielding element (not shown in the figures annexed herein) can carry out both a function of protecting the decorative element 9*a*, 9*b*, 9*c* from the cosmetic product 1, and a function of holding the decorative element 9*a*, 9*b*, 9*c* onto the support 6.

At the end of the aforesaid steps of preparing the cosmetic product 1 with through holes 3*a*, 3*b*, 3*c* and the decorative elements 9*a*, 9*b*, 9*c* onto the support 6 thereof, the particular embodiment of the method of the present invention as described herein provides a further step of assembling the support 6 carrying the decorative elements 9*a*, 9*b*, 9*c*, with the cosmetic product 1.

During this step (see FIG. 3), the decorative elements 9*a*, 9*b*, 9*c* are inserted within the through holes 3*a*, 3*b*, 3*c*, through a lower inlet opening of the latter, which is further surrounded by the inner side walls 4 of the holes of the bottom base 2, until the base portion 7 of the support 6 is abutted against the lower surface of the bottom base 2 and is thus held thereto by the mutual interference of parts.

In greater detail, in the embodiment as shown herein, the base portion 7 of the support 6 has such a size, and/or shape, and rigidity as to prevent the latter from passing through the through holes 3*a*, 3*b*, 3*c*, thus making the support 6 useless. In other words, the engagement of the base portion 7 with the lower inlet openings of the through holes 3*a*, 3*b*, 3*c*, must be such as to cause the substantially impossibility by this base portion 7 to pass within these holes 3*a*, 3*b*, 3*c*.

It should be further observed that, as discussed above, while in the embodiment described herein through holes 3*a*, 3*b*, 3*c* have been described, which substantially have the same size, these holes 3*a*, 3*b*, 3*c*, according to an alternative aspect of the present invention not shown herein, can however have shape and size different from each other, particularly of the inlet opening thereof, such as to allow different decorative elements 9*a*, 9*b*, 9*c* to be inserted therein, the latter also having mutually different sizes.

After the step of assembling the composite item described above, a step of inserting the composite item within a container 10 for cosmetics is also provided, such that the base portion 7 of the support 6 results to be interposed between the inner bottom surface 11 of the container 10 and the outer lower surface of the bottom base 2, and is thus held in position by this mechanical coupling.

It should be observed that this mechanical coupling of the base portion 7 with the cosmetic product 1 and container 10 can be alternatively provided, as stated above, by placing the assembly consisting of the cosmetic product 1 and support 6 (shown in FIG. 3) onto a different cosmetic product or a different layer of the same cosmetic 1, which has been previously placed onto the inner bottom wall 11 of the container 10.

Or, in a particular embodiment of the present invention, the support 6 can be made integral with the container 10, such as by means of gluing of the base portion 7 to said bottom wall 1, or yet this support 6 can be provided as one piece with said container 10. In the latter case, for example, the bottom wall 11 of the container 10 can be made according to a shape allowing the decorative elements 9*a*, 9*b*, 9*c* to be fastened or rested thereon, and can, again, by way of example, have shaped projections for supporting these decorative elements 9*a*, 9*b*, 9*c*, such that the support 6 coincides with this bottom wall 11 of the container 10 that is particularly shaped.

As may be seen in FIG. 4, the finished composite item obtained for example by means of the method described above, thus generally comprises a cosmetic product 1 provided with one or more through holes 3*a*, 3*b*, 3*c* in which one or more decorative elements 9*a*, 9*b*, 9*c* are at least partially inserted, which are in turn arranged onto a support 6. The support 6 advantageously comprises a base portion 7 that is shaped such as to interfere with the through holes 3*a*, 3*b*, 3*c* and thus prevent the base portion 7 of the support 6 from penetrating within these holes 3*a*, 3*b*, 3*c*. This composite item can be thus inserted within a suitable container for cosmetics 10 and sold to final users.

It should be noted that the cosmetic product 1, as stated above, can be any type of cosmetic product, such as a cosmetic obtained from pressed powders, pressed and dried slurries, extruded and oven-dried pastes, cast fluid cosmetic compositions, etc.

Particularly, the base portion 7 of the support 6 can either have a larger size than the inlet openings of the through holes 3*a*, 3*b*, 3*c*, or can be made integral or as one piece with the container 10, or yet it may have such a shape as being prevented from entering and passing through these holes 3*a*, 3*b*, 3*c*, by interference of parts, when the decorative elements 9*a*, 9*b*, 9*c* result to be inserted within the through holes 3*a*, 3*b*, 3*c*.

In the particular embodiment of the composite item as illustrated in FIGS. 3 and 4 annexed herein, as described above, this composite item also comprises a bottom base 2 being provided with holes matching said through holes 3*a*, 3*b*, 3*c*, which is placed below the cosmetic product 1 and suitable for defining the shape of this product 1.

In this case, the final assembly of the composite item within a container for cosmetics 10 provides for the support 6 to be arranged such that the decorative elements 9*a*, 9*b*, 9*c* are inserted within the holes 3*a*, 3*b*, 3*c* and the base portion 7 of the support 6, which is suitably flat and of reduced thickness, results to be interposed between the lower wall of the bottom base 2 and the inner bottom wall 11 of the container 10.

Particularly, the support 10 comprises projections 8*a*, 8*b*, 8*c* from the flat portion 7, which are suitable for supporting the decorative elements 9*a*, 9*b*, 9*c*, which, in turn, can be covered by a covering/shielding element, not shown herein, and made for example of a transparent polymeric film, which is arranged for holding the decorative elements 9*a*, 9*b*, 9*c* onto the support 6 and protecting these elements 9*a*, 9*b*, 9*c* from any contact with the cosmetic product 1.

The invention claimed is:

1. A method for making a composite item having at least one cosmetic product, or a layer thereof, at least one decorative element inserted within at least one through hole formed in said at least one cosmetic product and a single support with said composite item inserted within a container for cosmetics, which has a bottom wall and at least one sidewall extending from said bottom wall, the method comprising the steps of:
   a. making said at least one through hole within said at least one cosmetic product, or layer thereof, said at least one through hole having such a size as to allow said at least one decorative element to be at least partially inserted therein;
   b. fastening or resting said at least one decorative element onto said support, said support having a base portion which is shaped such as to geometrically interfere with at least one inlet opening of said at least one through hole, thereby hindering or preventing said base portion from entering said at least one through hole;
   c. at least partially arranging said at least one decorative element within said at least one through hole, through an outlet opening of said through hole, said base portion of said support being engaged with said inlet opening of said at least one through hole; and
   d. interposing said base portion of said support between said at least one cosmetic product, or layer thereof, and said bottom wall of said container, said base portion of said support extending such that said base portion is non-contactable with said sidewall of said container.

2. The method according to claim 1, wherein said base portion of said support is made integral or as one piece with said container for cosmetics.

3. The method according to claim 1, wherein said step of providing at least one through hole within said at least one cosmetic product, or layer thereof includes placing said cosmetic product within a containment bottom base having at least one hole matching said at least one through hole.

4. The method according to claim 3, wherein said step of at least partially arranging said at least one decorative element within said at least one through hole, through said outlet opening includes engaging said base portion of said support with said inlet opening of said at least one hole of said bottom base.

5. The method according to claim 1, wherein said step of fastening or resting said at least one decorative element onto a support provides that said at least one decorative element is made integral with said support by means of gluing and/or mechanical interaction of parts.

6. The method according to claim 1, further comprising a step of shielding one or more outer surfaces of said at least one solid decorative element, prior to said step of at least partially arranging said at least one decorative element within said at least one through hole.

7. The method according to claim 6, wherein said shielding step involves one or more outer surfaces of said at least one decorative element, which are intended to be placed in contact with said cosmetic product or said bottom base.

8. The method according to claim 1, wherein said cosmetic product is selected from: cosmetic products made of pressed powder, extruded cosmetic products, dried cosmetic products, cosmetic products of cast type.

9. The method according to claim 1, wherein said at least one decorative element is a solid body.

10. The method according to claim 1, wherein said decorative element is a non-cosmetic element.

11. The method according to claim 10, wherein said at least one decorative element is selected from: objects made of glass or crystal, stones, either semiprecious or precious, metallic or plastic objects.

12. A composite item, comprising:
   at least one cosmetic product, or layer thereof;
   at least one decorative element;
   a container for cosmetics having a bottom wall and at least one sidewall extending from said bottom wall, within which container said cosmetic product and said decorative element are arranged;
   a single support having a base portion arranged between said at least one cosmetic product and said bottom wall of said container, said base portion being non-contactable with said side wall of said container; and
   a hole, which has at least one inlet opening, formed in said at least one cosmetic product, or layer thereof, the at least one decorative element is at least partially inserted within the hole and is either fastened or rests on the support,
   wherein said hole is a through hole and said base portion shaped to geometrically interfere with the at least one inlet opening of said at least one through hole, hindering or preventing said base portion from entering said at least one through hole.

13. The item according to claim 12, wherein said base portion has a greater size, at least partially, than said inlet opening of said through hole.

14. The item according to claim 12, further comprising a containment bottom base for said cosmetic product, said bottom base comprising at least one hole matching said at least one through hole of said cosmetic product, or layer thereof.

15. The item according to claim 12, wherein said support is made integral or as one piece with said container for cosmetics.

16. The item according to claim 12, wherein said base portion of said support is substantially flat and said decorative element is either fastened or rested onto a portion projecting from said flat base portion.

17. The item according to claim 12, wherein said decorative element is a non-cosmetic element.

18. The item according to claim 12, wherein said support is made of plastic, metallic or composite material.

19. The item according to claim 12, wherein said cosmetic product comprises a plurality of through holes, said through holes having different sizes relative to each other.

20. The item according to claim 12, comprising a plurality of decorative elements, said decorative elements being different from each other.

* * * * *